United States Patent [19]
Clopton

[11] Patent Number: 5,960,938
[45] Date of Patent: Oct. 5, 1999

[54] CONVEYOR FOR CANTILEVERED LOADS

[75] Inventor: Robert T. Clopton, Magnolia, Ky.

[73] Assignee: Tekno, Inc., Cave City, Ky.

[21] Appl. No.: 08/878,810

[22] Filed: Jun. 19, 1997

[51] Int. Cl.$^6$ .................................................. B65G 29/00
[52] U.S. Cl. .............................. 198/867.13; 198/867.14; 198/838
[58] Field of Search ........................... 198/465.2, 867.13, 198/867.14, 805, 838; 104/172.3

[56] References Cited

U.S. PATENT DOCUMENTS

| | | | |
|---|---|---|---|
| 2,929,484 | 3/1960 | Longdon | 198/867.14 |
| 3,092,237 | 6/1963 | Miller | 198/867.13 |
| 3,407,919 | 10/1968 | Sandefur . | |
| 3,478,859 | 11/1969 | Krempel et al. | 198/465.2 |
| 3,646,656 | 3/1972 | Zilahy et al. . | |
| 3,767,025 | 10/1973 | Louis . | |
| 4,331,229 | 5/1982 | Kamm | 198/465.2 |
| 4,389,941 | 6/1983 | Berk et al. | 198/465.2 |
| 4,718,349 | 1/1988 | Wahrén . | |
| 4,823,459 | 4/1989 | Takeda | 198/465.2 |
| 5,046,598 | 9/1991 | Colamussi | 198/867.13 |
| 5,411,130 | 5/1995 | Noestheden . | |
| 5,553,697 | 9/1996 | McClement | 198/838 |
| 5,598,784 | 2/1997 | Kubsik | 198/838 |

OTHER PUBLICATIONS

Tekno, Inc. Brochure + Drawings.

*Primary Examiner*—Joseph E. Valenza
*Attorney, Agent, or Firm*—Theresa Fritz Camoriano; Camoriano and Associates

[57] ABSTRACT

A conveyor is provided for conveying cantilevered loads on wheeled carriages. The frame of the conveyor includes carriage roller support surfaces, which support the weight of the carriage and the load and guide the carriage along the conveyor. There is a belt along the frame which drives the carriages. Since the belt does not support the weight of the carriage, the force between the carriage and the belt need only be sufficient to drive the load. This reduces the energy used by the conveyor, reduces the wear on the conveyor, and reduces jostling of the products being conveyed.

26 Claims, 12 Drawing Sheets

CONVEYOR FOR CANTILEVERED LOADS

BACKGROUND OF THE INVENTION

The present invention relates to conveyors, and, in particular, to a conveyor for carrying a cantilevered load. There are some conveyors known in the prior art for carrying cantilevered loads. These conveyors usually have some type of a conveyor frame and a cantilevered carrier for carrying the cantilevered loads. The weight of the load and of the carrier are usually supported by the belt, roller, or other movable element that moves the carrier along the conveyor frame. Since the weight is carried by the moving elements, there is usually rapid wear of the conveyor. The typical prior art arrangement also provides a rough ride for the products being carried, and it involves substantial energy consumption. The known arrangements also generally make it impossible or impractical to stop one carrier moving along the conveyor without stopping the other carriers, because the carriers are generally tied to each other in some way. This means that, if there is a slow-down with one carrier, the entire line of carriers is slowed down, which is not desirable.

SUMMARY OF THE INVENTION

The present invention provides a conveyor for carrying cantilevered loads which solves many of the problems of prior art conveyors. In the present invention, the moving belt which drives the carriers does not support the weight of the carriers or of the loads carried on the carriers. This greatly reduces wear and energy consumption in the conveyor system. Also, since the weight of the carriers is supported on the stationary conveyor frame in the present invention, the products travelling along the conveyor of the present invention get a much smoother ride, with much less jostling of the products than in prior art conveyors.

The present invention provides a simple design for a cantilever conveyor, in which both the conveyor frame and the carrier which rolls along the frame may be made by extrusion. This eliminates the need for many extra parts which are common in the prior art, thereby reducing assembly costs.

The conveyor frame of the present invention preferably has slots formed along the carrier roller support surfaces, in order to receive wear strips. This means that, for example, the frame may be made of aluminum, and steel wear strips may be provided, thereby increasing the life of the frame. Also, the roller support surfaces are preferably crowned, so that the carrier may seek its own position on the frame, compensating for manufacturing tolerances.

DESCRIPTION OF THE PREFERRED EMBODIMENTS

Figure 1:
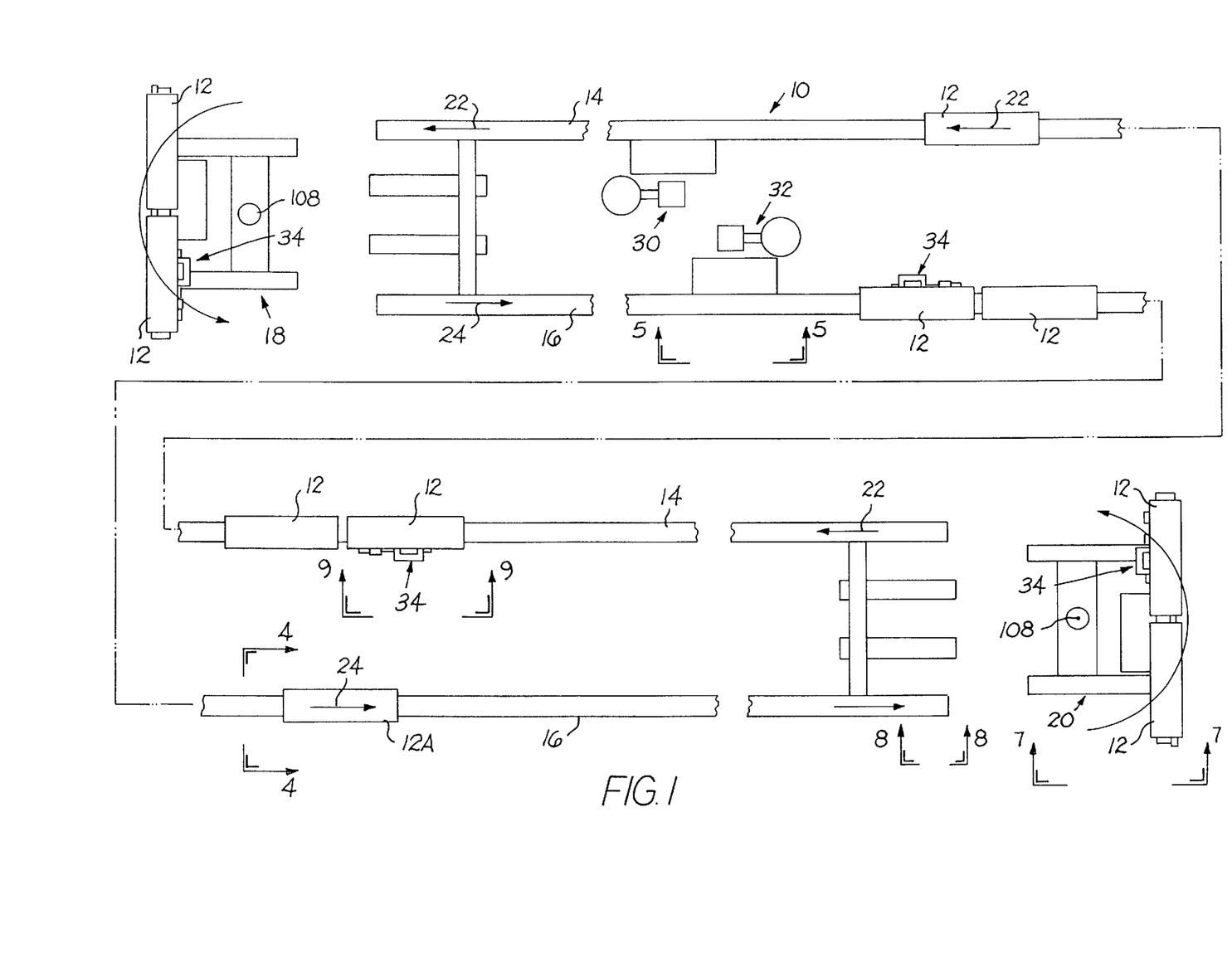
FIG. 1 is a schematic top view of a first conveyor system made in accordance with the present invention.

FIG. 1 shows a conveyor system 10, in which carriers 12 travel along an oval-shaped loop. There is a left elongated frame member 14, a right elongated frame member 16, and forward and rear turntables 18, 20 at the forward and back ends of the conveyor 10, respectively. Carriers 12 travelling forward along the right frame member 16, as shown by the arrow 24, reach the rear turntable 20, and are carried around to the left frame member 14, along which they travel the return trip, as shown by the arrows 22. When the carriers 12 reach the forward end of the conveyor 10, they are carried by the forward turntable 18 back to the right frame member 16, and the cycle is repeated.

Each of the frame members 14, 16 has a drive belt 28 (shown in later figures), which extends along the conveyor frame and drives the carriers 12. The belts 28 are driven by drives 30, 32, respectively. In this preferred embodiment, the belts 28 are roller chains, but other known types of belts could be used. There are stops 34 mounted at positions along the frame members 14, 16, to selectively stop the carriers 12. If the conveyor system 10 is part of an assembly line, used to assemble products being carried on the carriers 12, then there may be many stops 34, with each stop 34 serving as an assembly station along the conveyor's path. Stops 34 may also be located on the turntables 18, 20.

Figure 2:
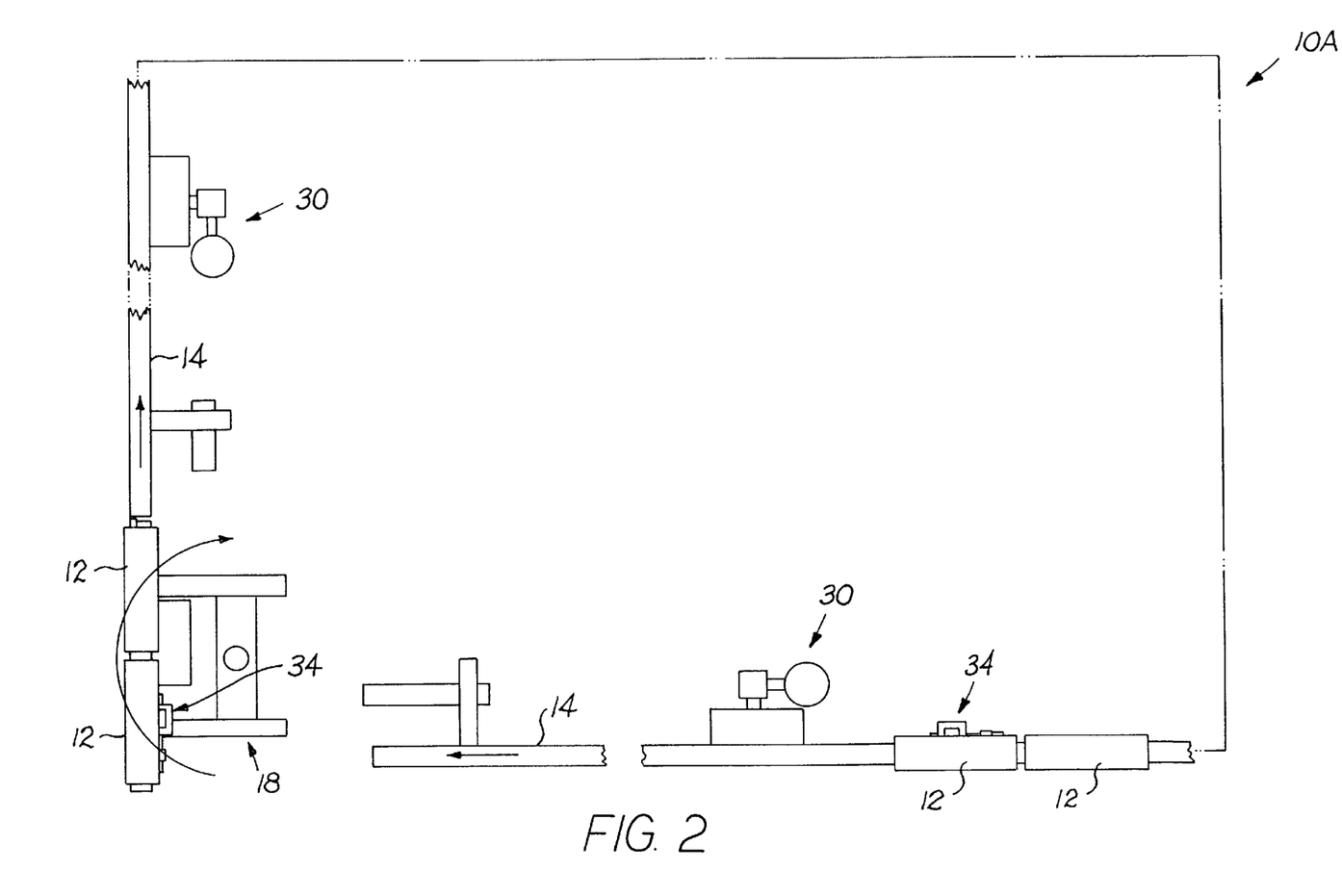
FIG. 2 is a schematic top view of a second conveyor system made in accordance with the present invention.

FIG. 2 shows a similar system 10A, with conveyor frames 14, carriers 12, stops 34, and drives 30, but with a different layout. In this embodiment, the turntable 18 only carries the carriages 12 around a 90° turn rather than 180°, as in the first embodiment. Obviously, the conveyor frames may be arranged in a variety of different ways without departing from the invention.

Figure 3:
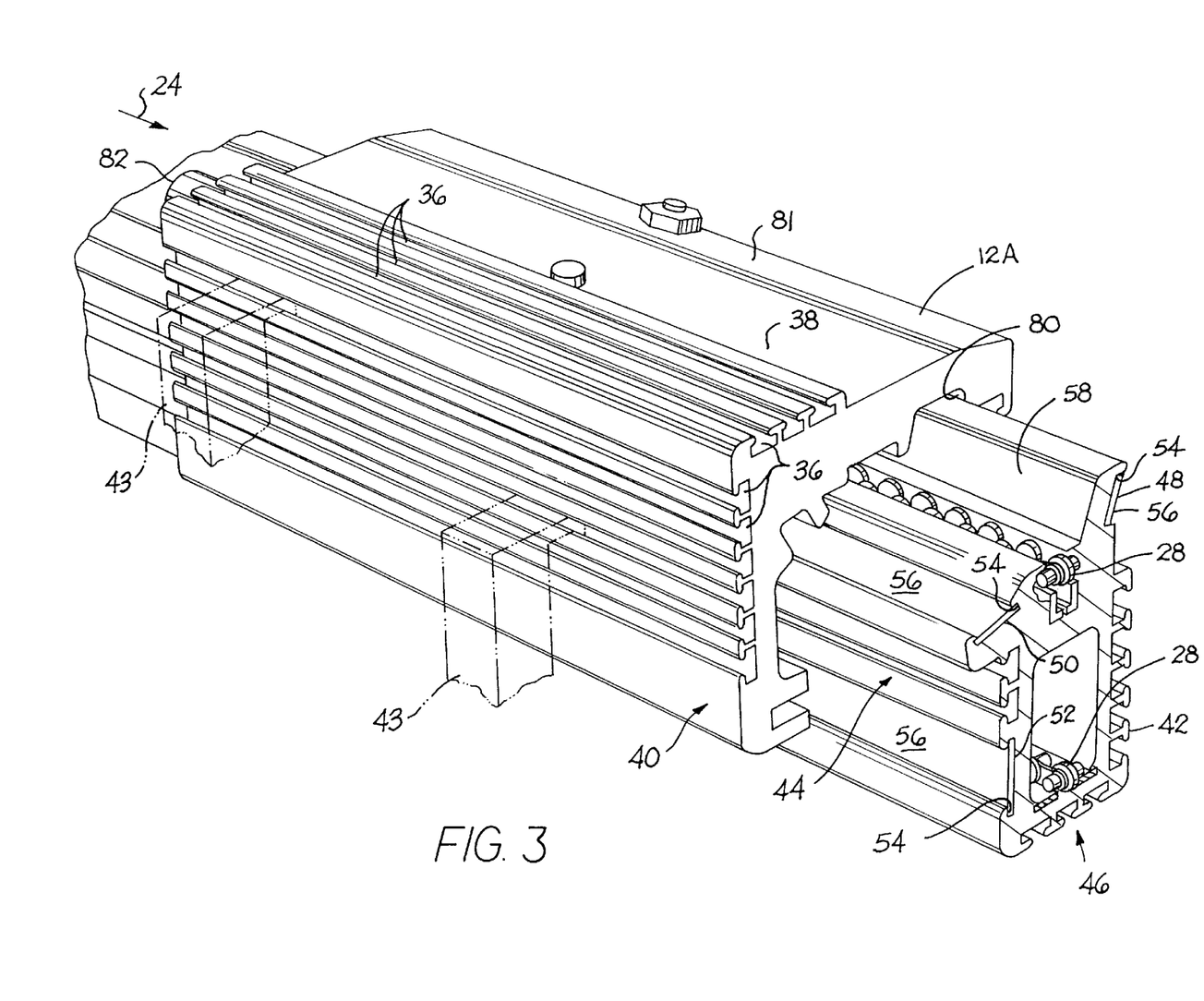
FIG. 3 is a rear perspective view of a portion of the conveyor frame and one of the carriers of FIG. 1.

FIG. 3 is a rear perspective view of the carriage 12A, of FIG. 1, as it is travelling along the right frame 16. This view shows the frame member 16, which has an endless loop of belt 28 mounted on it for driving the carriage 12A. The carriage 12A has several T-slots 36 along the right half of its top surface 38 and along its right surface 40, which make it easy to attach cantilevered loads to the right side of the carriage 12A. Two loads 43 are shown in phantom in FIG. 3. The frame member 16 also has T-slots along its left, right, and bottom surfaces 42, 44, 46. The frame member 16 also has first, second and third carrier roller support surfaces 48, 50, 52. There is a slot 54 formed at each of the roller support surfaces 48, 50, 52, and the slots 54 receive wear strips 56. The belt 28 projects out the top surface 58 of the frame member 16 in order to drive the carrier 12A. All the carriers 12 are essentially identical to the carrier 12A, and the frame members 14, 16 are mirror images of each other.

Figure 4:
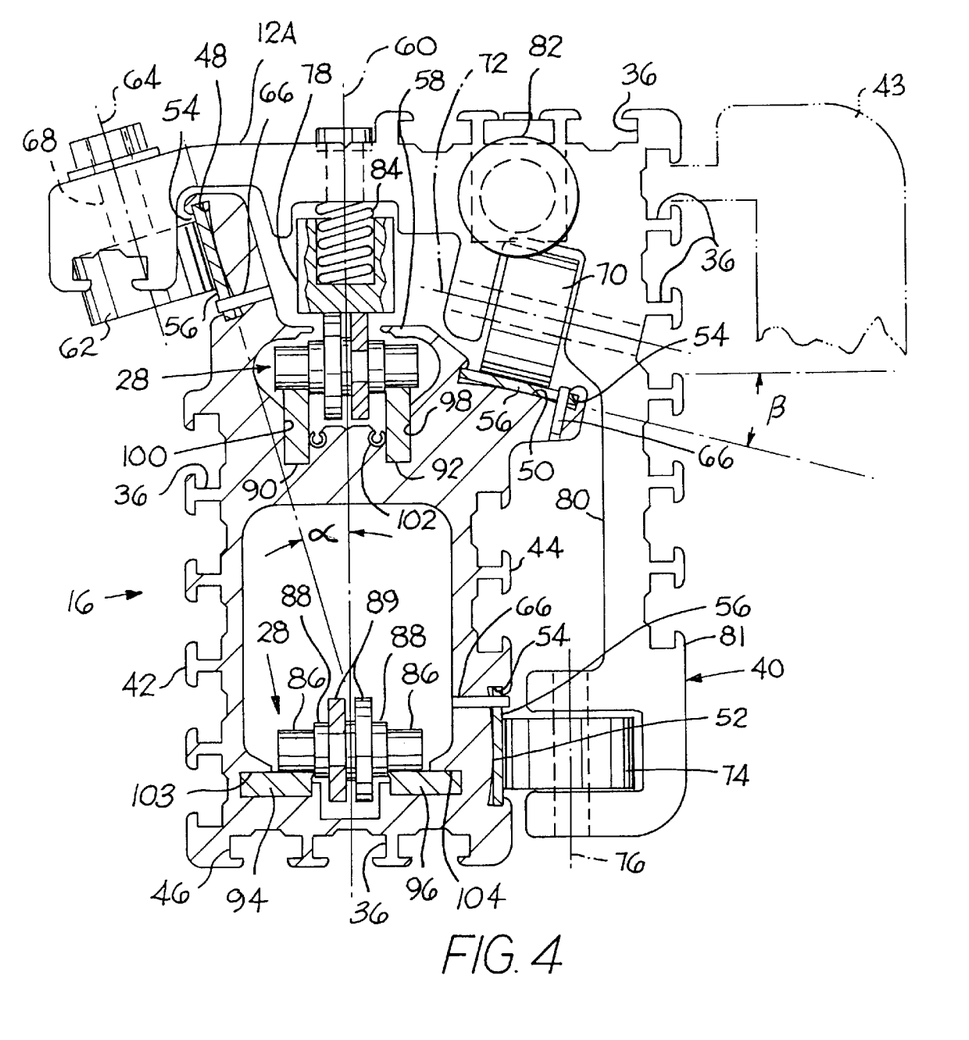
FIG. 4 is a view taken along the section 4—4 of FIG. 1.

FIG. 4 shows greater detail of the frame 16 and carriage 12A. An imaginary vertical axis 60 passes through the center of the belt 28 and through the frame member 16 and the carriage 12A. The first carrier roller support 48 is located to the left of the axis 60 and is at an acute angle α to the axis 60. The carrier 12A has a corresponding first roller 62, with an axis of rotation 64, which is substantially parallel to the first carrier roller support surface 48. There is a wear strip 56 in the slot 54 of the surface 48, on which the first roller 62 rolls. The wear strips 56 are pinned to the frame member 16 at intervals along the frame member 16 by pins 66, to ensure that the wear strips 56 do not slip relative to the frame member 16. The mounting bolt 68 which mounts the first roller 62 on the carriage 12A includes an eccentric (not shown), which permits slight adjustment of the position of the roller 62.

The second carrier roller support surface 50 is to the right of the axis 60 and is at an acute angle β to the horizontal. Since the second support surface 50 slopes downwardly away from the central axis 60, any debris falling onto that surface will tend to roll or slide off. The carriage 12A has a corresponding second roller 70, which has an axis of rotation 72 that is substantially parallel to the second roller support surface 50. As shown in FIG. 4, the angle between the plane of the first carrier roller support 48 and the plane of the second carrier roller support 50 is obtuse. Since the axes of rotation 64, 72 of the first and second rollers 62, 70 are parallel to their respective support surfaces the angle between the axes of rotation 64, 72 is also obtuse. As the second roller 70 rolls along the surface 50, it tends to want to travel downhill, due to the angle of the surface 50, which tends to pull the first roller 62 toward its support surface 48. Since the first support surface 48 is at an outward angle from the vertical, it prevents the carriage 12A from lifting vertically off of the frame 16 during operation of the conveyor. However, the carriage 12A and frame 16 are designed so that the carriage 12A can be removed from the frame at any point along the frame simply by rotating it counterclockwise and then lifting it up.

The third carrier roller support surface 52 is shown, in this preferred embodiment, as being located below the second roller support surface 50, and to the right of the axis 60, and oriented substantially vertically. The purpose of this third surface 52 is to counter the torque created by the cantilevered load 43. While the position and orientation shown here are preferred for that purpose, it will be understood by those skilled in the art that this third surface 52 could have different locations and orientations and still perform its function. The carrier 12A has a corresponding third roller 74 which has an axis of rotation 76 that is substantially parallel to the third roller support surface 52.

The rollers 62, 70, 74 all project from the inner surface 80 of the carriage 12A, while the loads 43 are supported on the outer surface 81 of the carriage 12A. It should be noted that the three roller support surfaces 48, 50, 52 are not parallel to each other and lie at angles to each other, so that they provide different types of support and guidance for the carriage 12A as it rolls along the frame 16. The first roller guides the carriage 12A and prevents the carriage from lifting up off of the frame during operation of the conveyor. The second roller 70 supports the weight of the carriage 12A and of anything mounted on the carriage 12A, so that none of the weight is carried on the chain 28. The third roller 74 guides the carriage and counters the torque of the cantilevered load.

There is a spring-mounted shoe 78 projecting from the inner surface 80 of the carriage 12A, which contacts two adjacent large, central rollers (or drive members) 89 of the belt 28 and serves as a belt follower, so that the carriage 12A can be driven by the belt 28. There is a bumper 82 on the back surface of the carriage 12A, so that, if another carriage 12 bumps into this carriage 12A, the bumper 82 will absorb the impact. The force of the spring 84 may be adjusted to increase or decrease the force with which the shoe 78 pushes down against the chain 28, depending upon the type of load to be carried. Since the weight of the load is carried on the frame 16, the force need only be sufficient to provide enough friction between the shoe 78 and the belt 28 to drive the carriage 12A.

Figure 12:
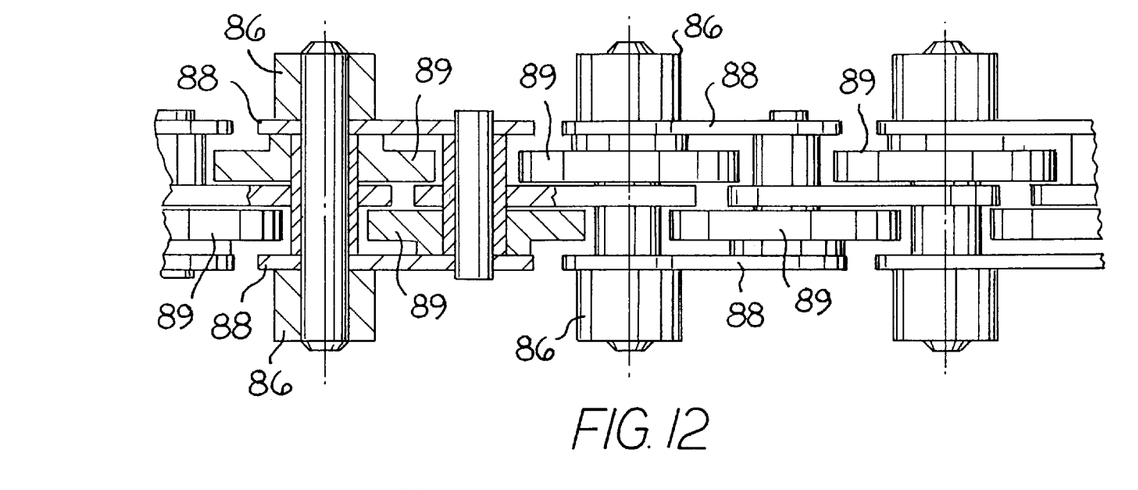
FIG. 12 is a broken-away top view, partially in section, of the chain belt of FIG. 3.
Figure 13:
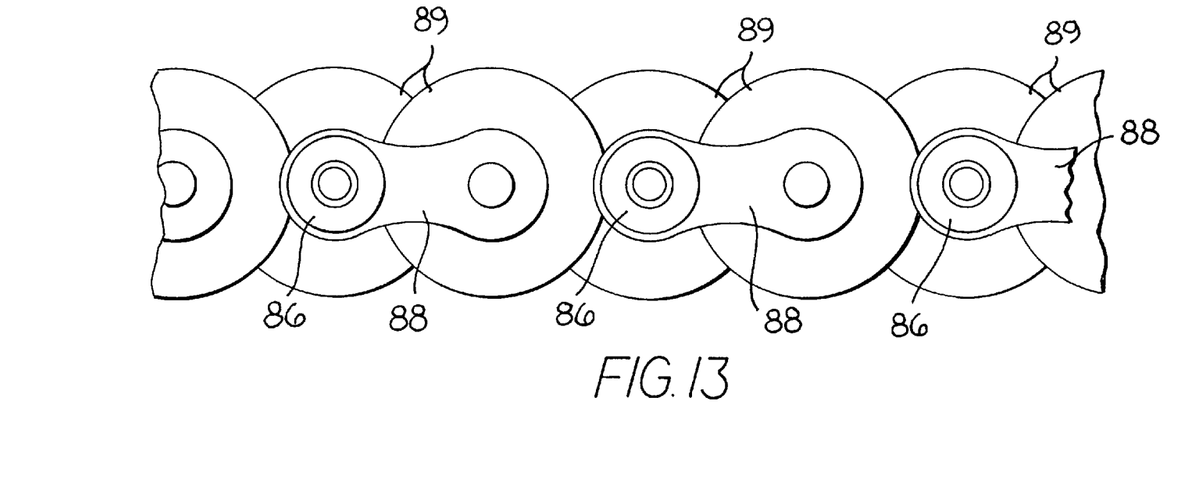
FIG. 13 is a side view of the chain belt of FIG. 12.

The belt 28 is a roller chain, with small rollers 86 on the outside of the sidebars 88 and staggered, large, central rollers (or drive members) 89 between the sidebars 88. (The preferred chain belt 28 is shown in more detail in FIGS. 12 and 13.) The small, outer rollers 86 roll on tracks 90, 92, 94, 96, mounted on the conveyor frame 16. The upper tracks 90, 92 are held in slots 98, 100 by split roll pins 102. These upper tracks 90, 92 can be inserted through the top opening of the frame 16. The lower tracks 94, 96 fit in slots 103, 104 and are slid in from the end of the frame 16. Since the weight of the carriage 12A is supported entirely on the frame 16, the load on the belt 28 is greatly reduced from the prior art designs in which the weight of the carrier and of the products are carried by the belt. This greatly reduces the wear of the belt 28 and of the rails 90, 92 from prior art designs.

Figure 4A:
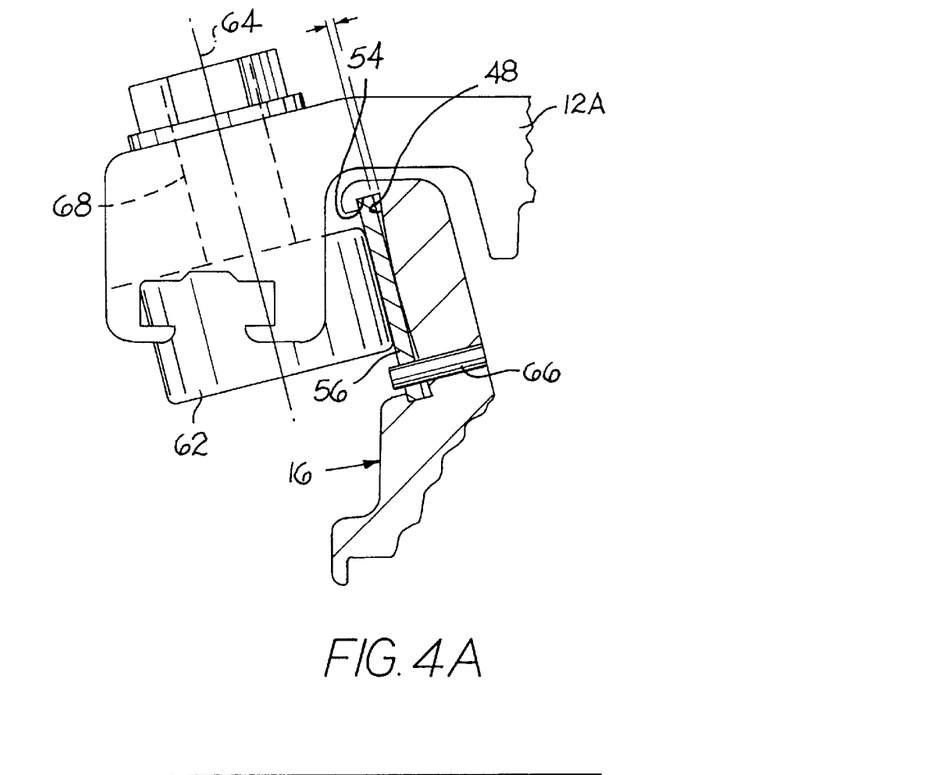
FIG. 4A is an enlarged view of one of the roller support surfaces of FIG. 4.

FIG. 4A is an enlarged view showing the upper left, first roller support surface 48 of the conveyor frame 16. In this view, it can be seen that the roller support surface 48 is crowned. This gives the wear strip 56 some room to rock in the slot 54. All of the roller support surfaces 48, 50, 52 are preferably crowned in this manner. This permits the carriage 12A to find its path along the frame 16, compensating for slight manufacturing tolerances.

Figure 5:
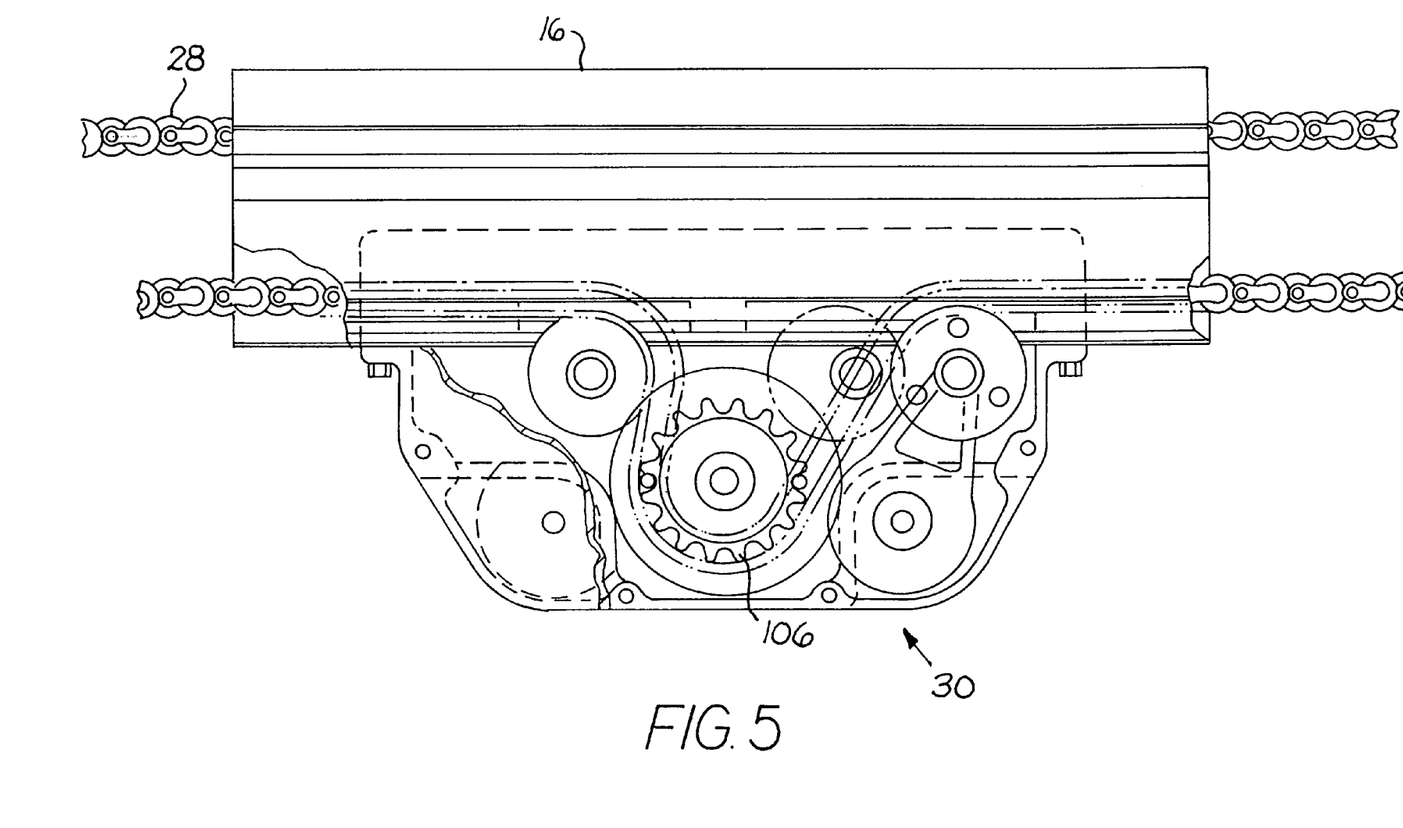
FIG. 5 is a view of the conveyor drive taken along the section 5—5 of FIG. 1.

FIG. 5 shows one of the belt drives 30. It can be seen that the drive 30 drives the lower run of the belt 28, so it is completely below the carriages 12 and does not interfere with the travel of the carriages 12 along the frame 16. The belt 28 is driven by a drive sprocket 106. For different types of belts, different known drives may be used.

Figure 6:
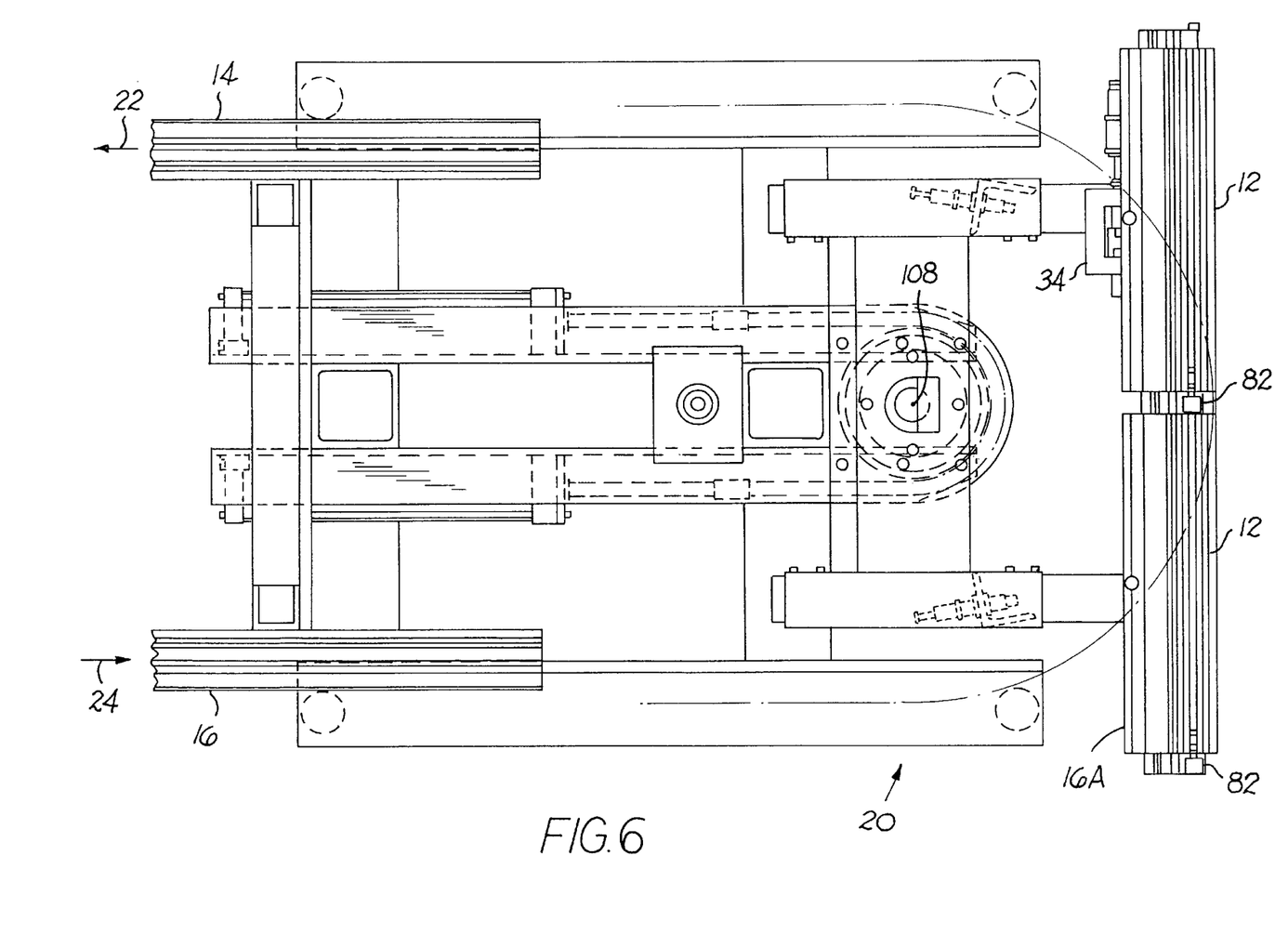
FIG. 6 is a top view of the turntable portion of FIG. 1.
Figure 7:
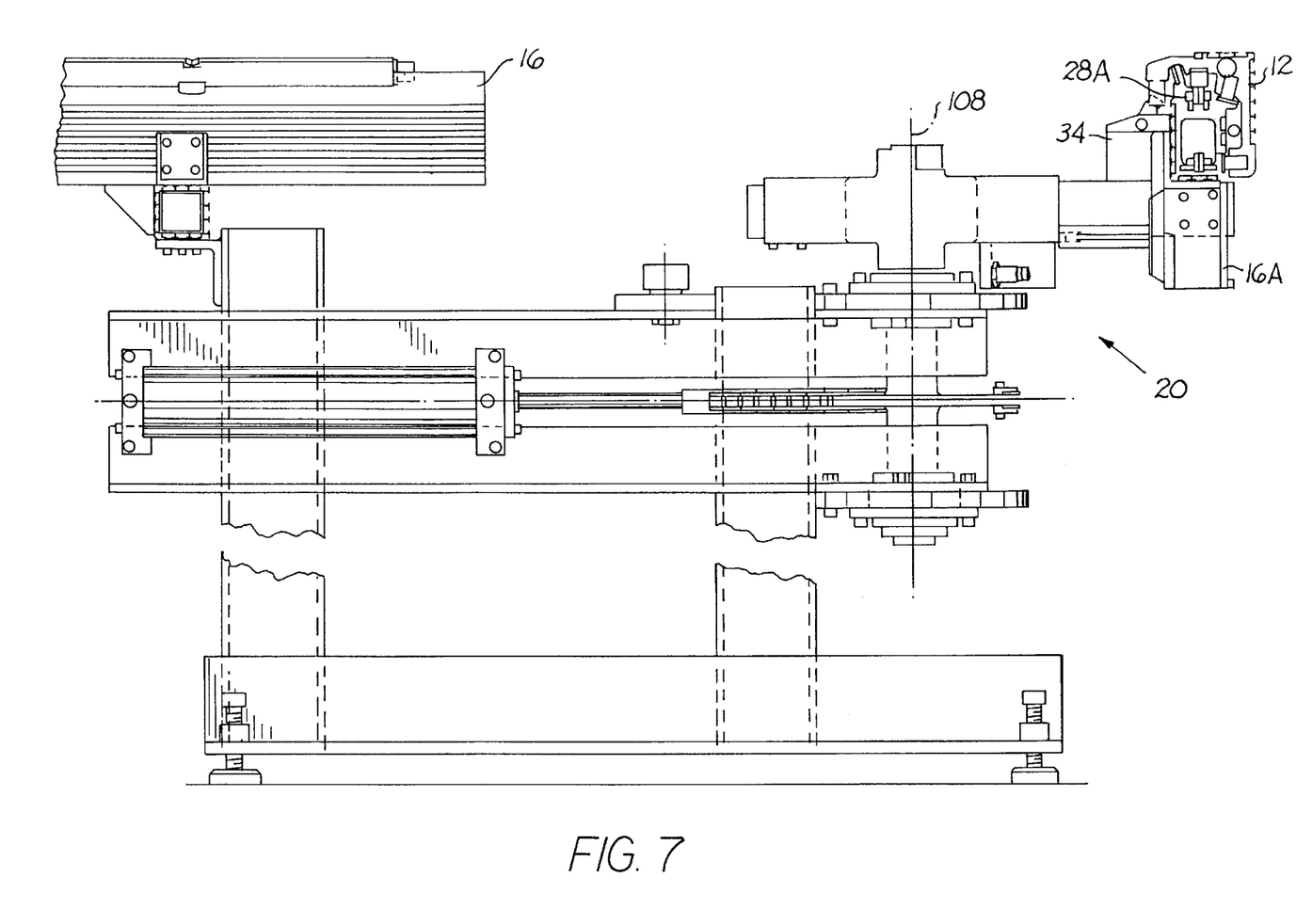
FIG. 7 is a view taken along the section 7—7 of FIG. 1.

FIGS. 6 and 7 show one of the turntables 20. The turntable 20 includes a frame section 16A, which can be aligned with either of the frames 14, 16, depending upon the position of the turntable 20. The turntable 20 rotates 180°, back and forth, about an axis 108, first aligning with the frame 16 and accepting carriages 12 from the frame 16, then pivoting to align with the frame 14, and discharging carriages 12 onto the frame 14. The section of frame 16A on the turntable 20 is essentially the same as the frames 14, 16. It preferably includes a stop 34. It includes its own drive belt 28A (shown in FIG. 7), to drive the carriages 12 that are on the turntable 20, and its own drive motor (not shown) to drive the belt 28A.

Figure 8:
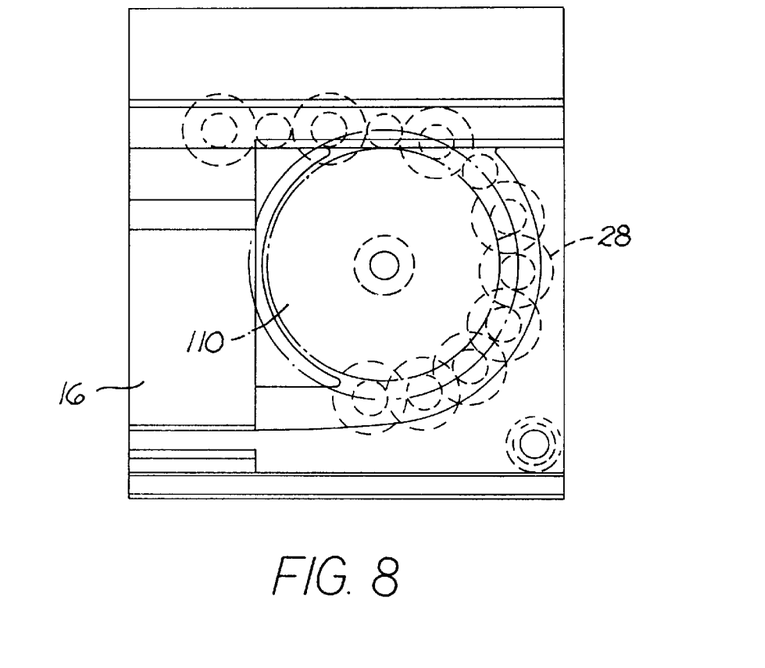
FIG. 8 is a view taken along the section 8—8 of FIG. 1.

FIG. 8 shows the guide wheel 110 at the back end of the frame 16, which supports the end of the belt 28. There is a similar guide wheel (not shown) at the front end of the belt 28.

Figure 9:
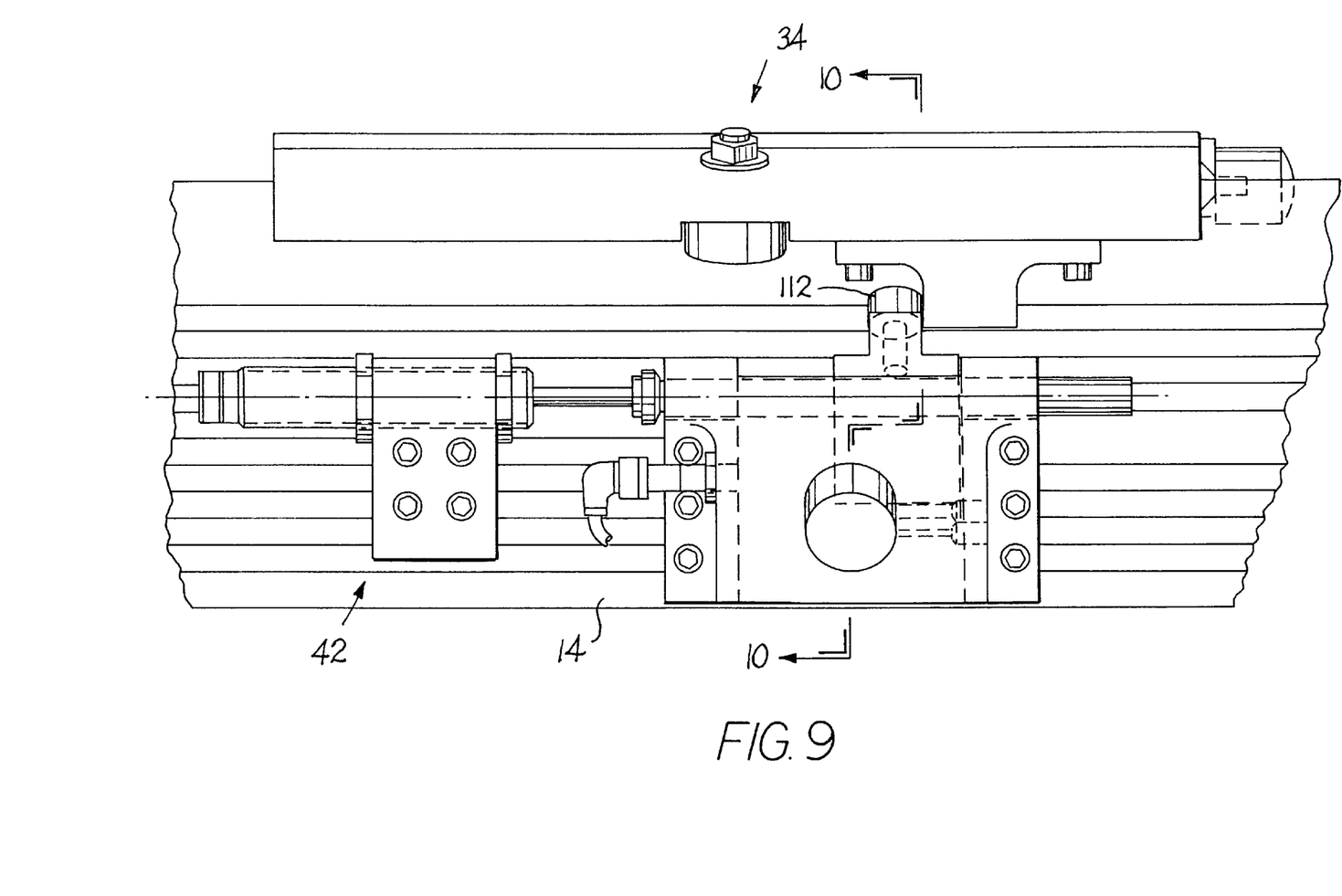
FIG. 9 is a view of a carrier stop taken along the section 9—9 of FIG. 1.
Figure 10:
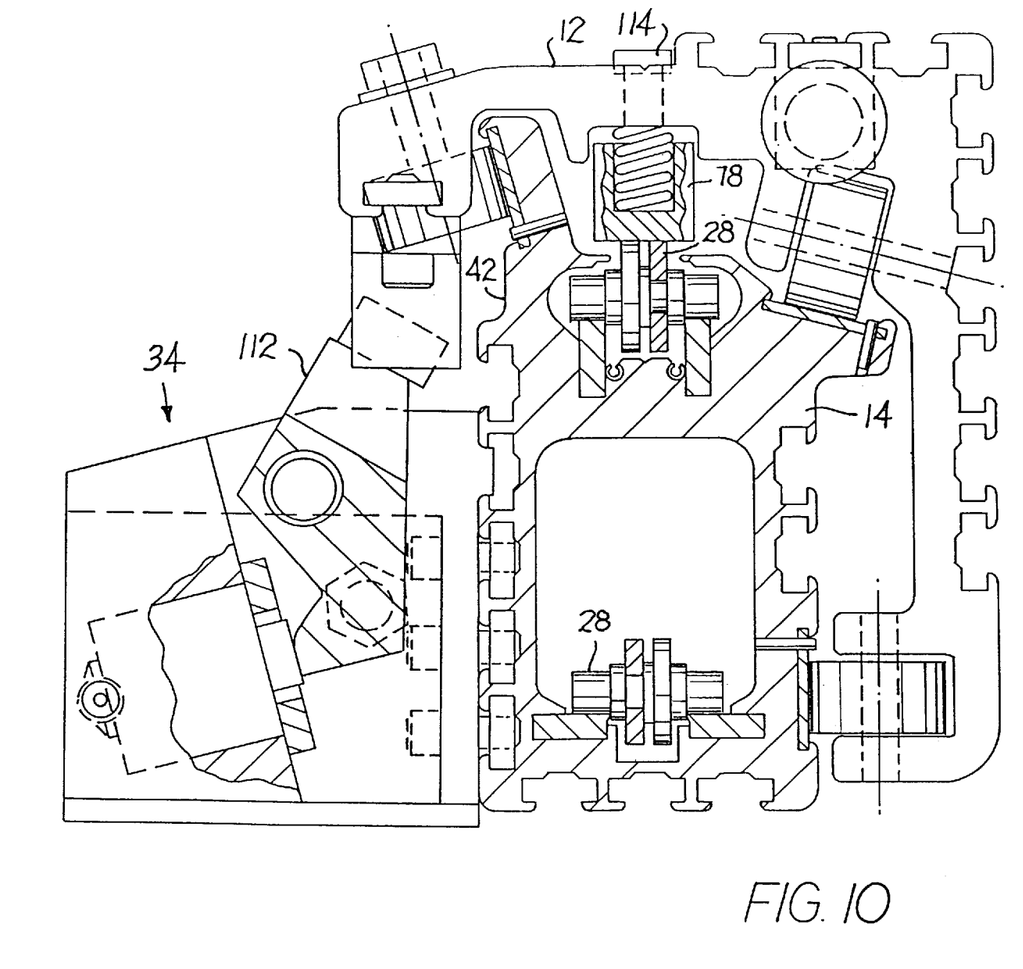
FIG. 10 is a view taken along the section 10—10 of FIG. 9.

FIGS. 9 and 10 show one of the stops 34. The stop 34 is mounted on the T-slots on the inner surface 42 of the frame member 14. It includes a pivot arm 112, which pivots up to contact the carrier 12 and stop the carrier 12. Since there is only a small frictional force between the shoe 78 and the chain 28, the chain 28 can just move past the carrier 12, with the carrier 12 stopped. The pivot arm 112 is operated by a pneumatic actuator.

It is also possible to provide a mechanism (not shown) to lift the pin 114 on which the shoe 78 is mounted, which will lift the shoe 78 off of the belt 28 in order to completely eliminate the friction force between the shoe 78 and the belt 28 when the carriage 12 is stopped.

While the embodiment shown in FIGS. 1–10 relies on friction between the shoe 78 and the belt 28 to drive the carriage 12, it would be possible to use other types of belt followers to transmit the driving force to the carriages 12. For example, there could be a magnetic force between the shoe 78 and the belt 28. If an electromagnet were used to create the magnetic field, the electromagnet might be turned off when the carriage 12 is stopped in order to eliminate the driving force on the stopped carriage 12.

Figure 11:
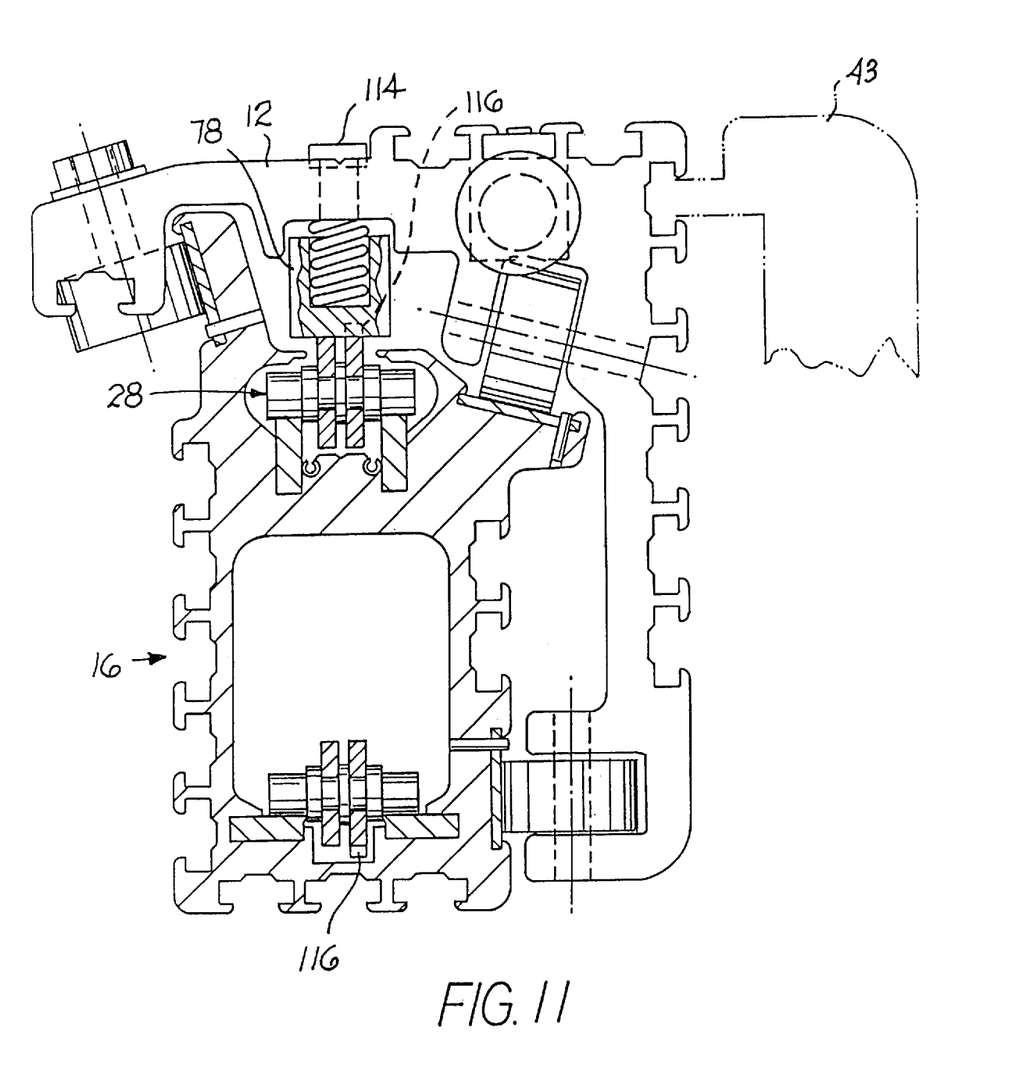
FIG. 11 is the same view as FIG. 4, but showing an alternative drive between the belt and the carriage.

FIG. 11 shows an alternative embodiment, in which the shoe 78 continues to be the belt follower, but it follows the belt 28 by being pushed by a pusher arm 116 on the belt 28 rather than by friction with the top surface of the belt 28. In this embodiment, the pin 114 would have to be lifted up to lift the shoe 78 above the pusher 116 in order to allow the carriage 12 to stop while the belt 28 continues to move. FIG. 11 also shows one of the pusher arms 116 in the lower run of the chain 28.

It will be obvious to those skilled in the art that modifications may be made to the embodiments described above without departing from the scope of the present invention.

What is claimed is:

1. A conveyor for carrying cantilevered loads, comprising:
   an elongated frame element, defining first and second elongated carriage roller support surfaces lying in different, non-parallel imaginary planes which intersect at an obtuse angle;
   a drive belt extending along said elongated frame element;
   a plurality of independent carriages mounted on said elongated frame element; each of said carriages including first and second carriage rollers supported on said first and second carriage roller support surfaces, respectively, so that said elongated frame element supports the weight of the carriage and guides the carriage as it travels along the frame; and a belt follower mounted on said carriage such that motion of the belt drives the belt follower, causing said carriage to move along with said belt, wherein each of said independent carriages can be removed from said elongated frame element simply by rotating the carriage and lifting it straight up, without having to disassemble any part of the conveyor.

2. A conveyor frame for supporting a carriage with a cantilevered load, comprising:
   an elongated frame member defining a vertical axis, and having first and second elongated, carriage roller support surfaces; said first carriage roller support surface lying to the left of the vertical axis and at an acute angle to the vertical axis; said second carriage roller support surface lying to the right of the vertical axis and at an acute angle to the horizontal, sloping downwardly away from the vertical axis, so that, when a carriage having first and second rollers and a cantilever load on the right of the vertical axis is mounted on said frame member with the first and second rollers rolling on the first and second roller support surfaces, respectively, the first carriage roller support surface will prevent the cantilevered load from lifting the carriage up, off of the frame, and the second carriage roller support surface will support the weight of the carriage; and
   a belt extending along said frame for driving a carriage mounted on the frame.

3. A carriage for a conveyor for carrying cantilevered loads, comprising:
   a carriage body, defining an outer surface and an inner surface;
   first, second, and third carriage rollers mounted on said carriage body and projecting from the inner surface of said carriage body, said first, second, and third carriage rollers having three different, non-parallel axes of rotation, wherein, when the carriage is placed on a support frame adjacent to the inner surface of the carriage body and a cantilevered load is placed on said carriage body, at least one of said carriage rollers supports the weight of the cantilevered load, and at least another of said carriage rollers prevents the cantilevered load from lifting the carriage up off of the support frame; and a spring-loaded shoe projecting from the inner surface of said carriage.

4. A conveyor for carrying cantilevered loads, as recited in claim 1, wherein the carriage is driven by friction between the belt follower and the belt.

5. A conveyor for carrying cantilevered loads as recited in claim 1, and further comprising a projection from said belt; wherein mechanical contact between the belt follower and the projection drives the carriage.

6. A conveyor for carrying cantilevered loads as recited in claim 4, wherein said belt follower is a spring-loaded shoe.

7. A conveyor for carrying cantilevered loads as recited in claim 1, wherein each of said carriage roller support surfaces is crowned.

8. A conveyor for carrying cantilevered loads as recited in claim 1, wherein said elongated frame element defines a slot at each of said carriage roller support surfaces for receiving a wear strip.

9. A conveyor for carrying cantilevered loads as recited in claim 8, wherein each of said carriage roller support surfaces is crowned.

10. A conveyor for carrying cantilevered loads as recited in claim 1, wherein said belt is a roller chain, and said elongated frame element includes tracks which support the roller chain.

11. A conveyor frame as recited in claim 2, wherein each of said carriage roller support surfaces defines a slot for receiving a wear strip.

12. A conveyor frame as recited in claim 11, wherein each of said carriage roller support surfaces is crowned.

13. A conveyor frame as recited in claim 2, and further comprising a third carriage roller support surface for countering torsional forces which will be created by a load to the right of the vertical axis.

14. A conveyor frame as recited in claim 2, wherein said belt is a roller chain, and wherein said frame includes tracks to support the roller chain.

15. A carriage as recited in claim 3, wherein the first carriage roller is on one side of the shoe, and the second and third carriage rollers are on the other side of the shoe.

16. A carriage as recited in claim 3, wherein the spring force of the spring-loaded shoe can be adjusted.

17. A conveyor for carrying cantilevered loads as recited in claim 8, and further comprising a wear strip in each of said slots, said wear strips being pinned to said elongated frame element.

18. A conveyor for carrying cantilevered loads as recited in claim 9, and further comprising a wear strip in each of said slots.

19. A conveyor frame as recited in claim 11, and further comprising a wear strip in each of said slots.

20. A conveyor frame as recited in claim 19, wherein said wear strips are pinned to said frame.

21. A conveyor, comprising:
   an elongated frame element, defining first and second elongated carriage support surfaces lying in different, non-parallel planes;

a roller chain extending along said elongated frame element, said roller chain including rollers supported on said elongated frame element and drive members carried by said rollers;

a plurality of independent carriages mounted on said elongated frame element; each of said carriages supported on said first and second carriage support surfaces, respectively, so that said elongated frame element supports the weight of the carriage and guides the carriage as it travels along the frame;

each of said carriages including a spring-loaded shoe, projecting toward said roller chain so as to contact the respective drive member adjacent to the shoe, so that, as the roller chain rolls along said elongated frame element, friction between said spring-loaded shoe and said drive member causes the carriage to move along with the roller chain, and wherein, when an external force is applied to one of the carriages to stop that one carriage, the chain continues to run, continuing to drive the other carriages; and wherein each of said independent carriages can be removed from said elongated frame element simply by rotating the carriage and lifting it straight up, without having to disassemble any part of the conveyor.

22. A conveyor as recited in claim 21, wherein said drive members are rollers, and wherein said roller chain is located below the carriages.

23. A conveyor as recited in claim 21, and further comprising a plurality of first rollers and second rollers on one of said conveyor frame and said carriages, said first and second rollers rotating about axes parallel to said first and second carriage support surfaces, respectively.

24. A conveyor as recited in claim 23, wherein said first rollers and second rollers are mounted on said carriages.

25. A conveyor as recited in claim 21, wherein said first and second carriage support surfaces lie in planes which intersect at an obtuse angle.

26. A carriage for a conveyor for carrying cantilevered loads, comprising:

a carriage body, defining an outer surface and an inner surface;

first and second carriage rollers mounted on said carriage body and projecting from the inner surface of said carriage body, said first and second carriage rollers being mounted so as to permit them to roll on support surfaces lying on planes that intersect at an obtuse angle, wherein, when the carriage is placed on a support frame adjacent to the inner surface of the carriage body and a cantilevered load is placed on the carriage body, at least said second carriage roller supports the weight of the cantilevered load, and said first carriage roller prevents the cantilevered load from lifting the carriage up off of the support frame; and a spring-loaded shoe projecting from the inner surface of said carriage.

* * * * *